US010785014B2

(12) United States Patent
Tamura et al.

(10) Patent No.: US 10,785,014 B2
(45) Date of Patent: Sep. 22, 2020

(54) COMPUTATION DEVICE, CONTROL DEVICE AND CONTROL METHOD

(71) Applicant: OMRON Corporation, Kyoto (JP)

(72) Inventors: Akihiro Tamura, Moriyama (JP); Makoto Iwai, Kizugawa (JP); Shigeyuki Eguchi, Joyo (JP); Yasunori Fukuda, Ritto (JP); Kenichi Iwami, Sakai (JP); Kazunari Miyake, Omihachiman (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/478,473

(22) PCT Filed: Nov. 27, 2017

(86) PCT No.: PCT/JP2017/042373
§ 371 (c)(1),
(2) Date: Jul. 16, 2019

(87) PCT Pub. No.: WO2018/146909
PCT Pub. Date: Aug. 16, 2018

(65) Prior Publication Data
US 2019/0372746 A1 Dec. 5, 2019

(30) Foreign Application Priority Data

Feb. 7, 2017 (JP) ................ 2017-020409

(51) Int. Cl.
*H04L 7/00* (2006.01)
*H04W 72/12* (2009.01)
(Continued)

(52) U.S. Cl.
CPC .......... *H04L 7/0004* (2013.01); *G05B 19/054* (2013.01); *H04L 1/1887* (2013.01); *H04W 72/1242* (2013.01); *G05B 2219/1101* (2013.01)

(58) Field of Classification Search
CPC ... H04L 1/1887; H04L 47/6275; H04L 47/70; H04W 72/1242
See application file for complete search history.

(56) References Cited

U.S. PATENT DOCUMENTS 4,796,232 A * 1/1989 House ................ G06F 13/18
365/189.03
4,991,133 A * 2/1991 Davis ................ G06F 13/128
709/234

(Continued)

FOREIGN PATENT DOCUMENTS

JP  H0916221  1/1997
JP  2010198600  9/2010

(Continued)

OTHER PUBLICATIONS

"International Search Report (Form PCT/ISA/210) of PCT/JP2017/042373," dated Jan. 23, 2018, with English translation thereof, pp. 1-2.

(Continued)

Primary Examiner — Raj Jain
(74) Attorney, Agent, or Firm — JCIPRNET

(57) ABSTRACT

Provided is a computation device including a communication interface; a first transmission control part for sending a first communication frame at every predetermined cycle via a transmission path; a second transmission control part for sending a second communication frame in response to an arbitrary event request; and a priority management part. Upon receiving an issuance request of a second event request from a second event issuance part, the priority management part waits for completion of sending processing for a second communication frame corresponding to a first event request currently processed by the second transmission control part, and permits issuance of the second event request to the second event issuance part. The second (Continued)

transmission control part suspends processing for a subsequent first event request following the first event request currently processed until completion of processing for the second event request is complete.

14 Claims, 12 Drawing Sheets

(51) Int. Cl.
*H04L 1/18* (2006.01)
*G05B 19/05* (2006.01)

(56) References Cited

U.S. PATENT DOCUMENTS

| | | | | |
|---|---|---|---|---|
| 5,802,560 | A * | 9/1998 | Joseph | G06F 12/0848 |
| | | | | 711/118 |
| 5,881,247 | A * | 3/1999 | Dombrosky | G06F 13/409 |
| | | | | 709/232 |
| 9,184,933 | B2 * | 11/2015 | Nakamura | H04L 12/403 |
| 2007/0189253 | A1 * | 8/2007 | Choi | H04L 1/1887 |
| | | | | 370/338 |
| 2017/0041243 | A1 * | 2/2017 | Nakayasu | H04L 47/56 |
| 2017/0111183 | A1 * | 4/2017 | Kojima | H04L 12/40169 |
| 2019/0372746 | A1 * | 12/2019 | Tamura | H04L 7/0004 |

FOREIGN PATENT DOCUMENTS

| | | |
|---|---|---|
| JP | 2011216085 | 10/2011 |
| JP | 2014138206 | 7/2014 |
| WO | 2016009477 | 1/2016 |

OTHER PUBLICATIONS

"Written Opinion of the International Searching Authority (Form PCT/ISA/237) of PCT/JP2017/042373," dated Jan. 23, 2018, with English translation thereof, pp. 1-6.

\* cited by examiner

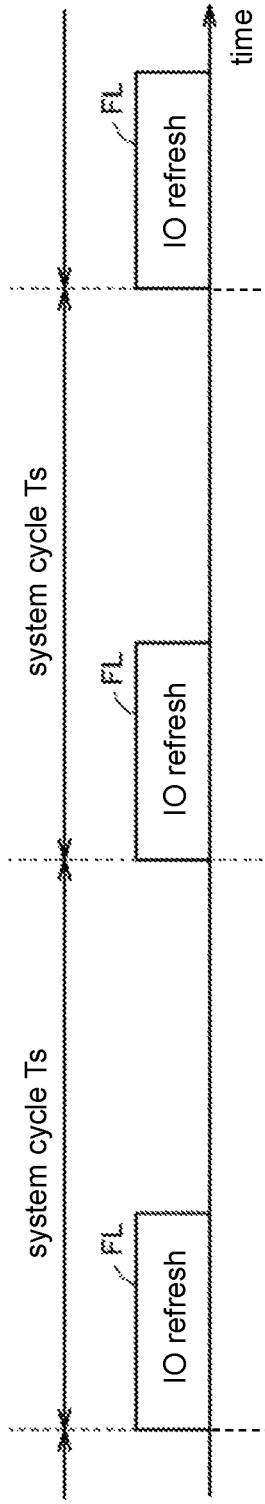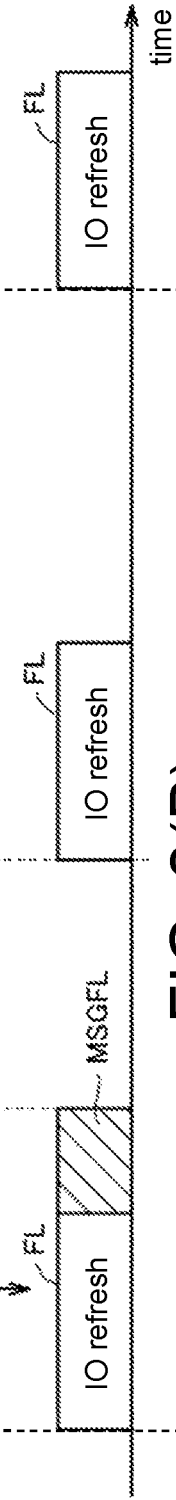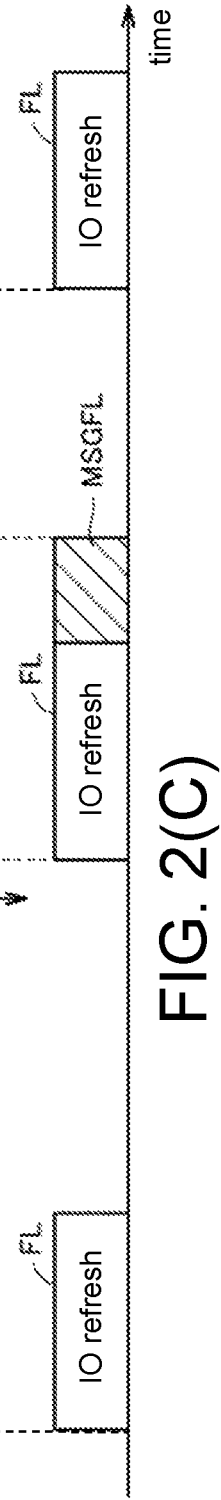

RELATED ART not knowing at
which timing it will
be dequeued

COMPUTATION DEVICE, CONTROL DEVICE AND CONTROL METHOD

CROSS-REFERENCE TO RELATED APPLICATION

This application is a 371 application of the International PCT application serial no. PCT/JP2017/042373, filed on Nov. 27, 2017, which claims the priority benefit of Japan Patent Application No. 2017-020409, filed on Feb. 7, 2017. The entirety of each of the above-mentioned patent applications is hereby incorporated by reference herein and made a part of this specification.

BACKGROUND

Technical Field

The invention relates to a computation device that configures a control device including one or a plurality of functional units and to the control device.

Description of Related Art

Control devices such as programmable controllers (PLCs) are widely used as main components for realizing various factory automations (FAs). Such control devices may be configured by a CPU unit that executes various programs and one or a plurality of functional units connected to the CPU unit via a transmission path. In such a configuration, data is exchanged between the CPU unit and the functional units via the transmission path.

Incidentally, in control devices such as a PLC, there is a demand to synchronize acquisition of input values and output of control instructions with high precision. In order to meet such demands, the CPU unit and the functional units connected via the transmission path are maintained in a state where clocks (typically implemented by counters) built therein respectively are synchronized with each other. Then, the CPU unit and the functional units respectively adjust the transmission timing and the reception timing based on the clocks synchronized with each other. For example, Japanese Laid-Open No. 2011-216085 (Patent Document 1) discloses such a method of clock synchronization, that is, time synchronization.

In such a time synchronized configuration, input output (IO) refresh including processing in which the CPU unit acquires input data collected by the functional units and processing in which control instructions calculated by the CPU unit are output to the functional units is executed at every predetermined cycle. Data may be exchanged by message communication during a period other than the period in which the IO refresh is executed. In Patent Document 1, it is disclosed that a propagation delay time is obtained by actually transmitting and receiving a message between a master unit and a slave unit and that time correction is performed with use of the propagation delay time.

SUMMARY

The message communication as described above may be used, for example, for processing to establish a connection between a CPU unit and a functional unit and for various activation processing. It is preferable that the data transmitted by message communication used for such applications is sent out as soon as possible, but generally, since the IO refresh is set with the highest priority, there are cases where data cannot be transmitted quickly by message communication due to the status of the transmission path.

The invention is to provide a configuration for guaranteeing an arrival time to a transmission destination in message communication in a transmission path in which a communication frame relating to IO refresh or the like is transmitted at a predetermined cycle.

According to an aspect of the invention, a computation device configuring a control device includes a communication interface that exchanges data with one or a plurality of functional units via a transmission path; a first transmission control part that sends out a first communication frame at every predetermined cycle via the transmission path; a second transmission control part that sends out a second communication frame in response to an arbitrary event request during a period in which the first communication frame is not transmitted; a first event issuance part that issues a first event request according to processing; a second event issuance part that issues a second event request having a higher priority than the first event request; and a priority management part that processes the second event request issued by the second event issuance part with priority. The priority management part, upon receiving an issuance request of the second event request from the second event issuance part, waits for completion of sending processing for the second communication frame corresponding to the first event request currently under processing by the second transmission control part, and then permits issuance of the second event request to the second event issuance part. The second transmission control part suspends processing for a subsequent first event request following the first event request currently under processing until completion of processing for the second event request.

second transmission control part may include a first queue that sequentially stores the first event request; and a second queue that sequentially stores the second event request.

priority management part, upon receiving the issuance request of the second event request, notifies the second transmission control part of the issuance request, and the second transmission control part, after notified of the issuance request of the second event request, notifies the priority management part of an indication that the second event request can be processed when the processing for the first event request currently under processing is completed.

the second event request may include an instruction for a specific functional unit to establish synchronous communication with the computation device via the transmission path.

computation device and the one or the plurality of functional units connected via the transmission path each may have a clock synchronized with each other, and the instruction to establish the synchronous communication includes timing indicated by the clocks synchronized with each other.

The timing may be set to a value associated with a transmission cycle of the first communication frame.

According to another aspect of the invention, a control device includes a computation device and one or a plurality of functional units connected to the computation device via a transmission path so as to be able to exchange data. The computation device includes a first transmission control part that sends out a first communication frame at every predetermined cycle via the transmission path; a second transmission control part that sends out a second communication frame in response to an arbitrary event request during a period in which the first communication frame is not transmitted; a first event issuance part that issues a first event request according to processing; a second event issuance part that issues a second event request having a higher priority than the first event request; and a priority management part for processing the second event request issued by the second event issuance part with priority. The priority management part, upon receiving an issuance request of the second event request from the second event issuance part, waits for completion of sending processing for the second communication frame corresponding to a first event request currently under processing by the second transmission control part, and then permits issuance of the second event request to the second event issuance part. The second transmission control part suspends processing for a subsequent first event request following the first event request currently under processing until completion of processing for the second event request.

According to still another aspect of the invention, provided is a control method in a control device including a computation device and one or a plurality of functional units connected to the computation device via a transmission path so as to be able to exchange data. The control method includes sending out a first communication frame at every predetermined cycle via the transmission path; issuing a first event request according to processing; issuing a second event request having a higher priority than the first event request; sending out a second communication frame in response to the first event request or the second event request during a period in which the first communication frame is not transmitted; upon receiving an issuance request of the second event request, waiting for completion of sending processing for the second communication frame corresponding to the first event request currently under processing, and then permitting issuance of the second event request; and suspending processing for a subsequent first event request following the first event request currently under processing until completion of processing for the second event request.

According to the invention, it is possible to guarantee an arrival time to a transmission destination in message communication in a transmission path in which a communication frame relating to IO refresh or the like is transmitted at a predetermined cycle.

BRIEF DESCRIPTION OF THE DRAWINGS

FIGS. 2(A) to 2(C) are schematic diagrams for illustrating data transmission on the local buses of the PLC according to the embodiment.

DESCRIPTION OF THE EMBODIMENTS

Figure 1:
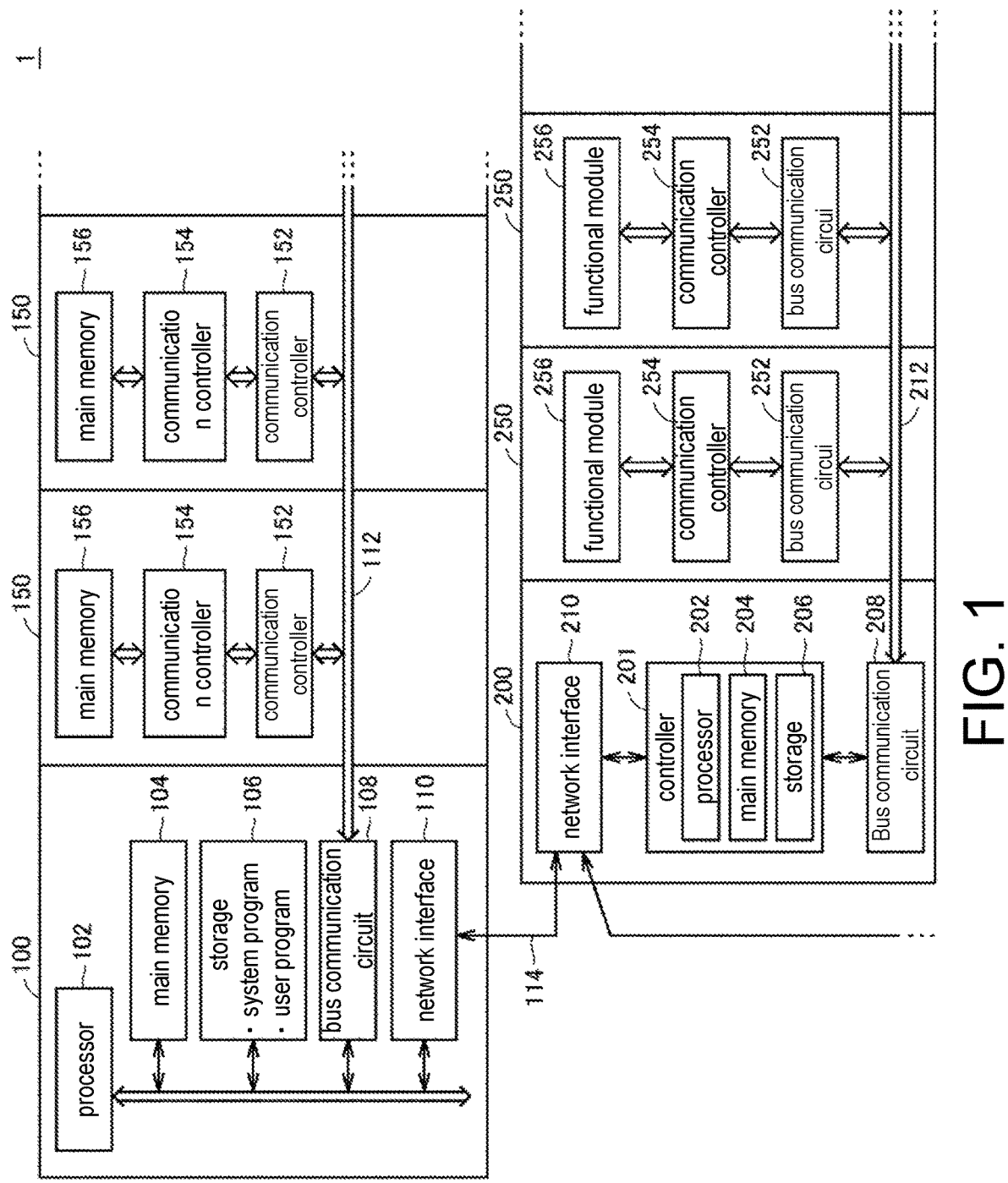
FIG. 1 is a schematic diagram showing a main configuration of the PLC according to the embodiment.

Embodiments of the invention will be described in detail below with reference to the drawings. Further, in the drawings, identical or corresponding parts are denoted by the same reference numerals and descriptions thereof will not be repeated.

In the following description, a programmable controller (PLC) will be described as a specific example to illustrate a typical example of a "control device," but the control device is not limited to the name of PLC, and the technical ideas disclosed in the specification are applicable to any control device.

A. Device Configuration

First, a device configuration of a PLC according to this embodiment will be described. FIG. 1 is a schematic diagram showing a main configuration of the PLC according to the embodiment.

With reference to FIG. 1, a PLC 1 according to the embodiment is basically configured by a CPU unit 100 and one or a plurality of functional units 150. The CPU unit 100 is an element configuring the PLC 1 and corresponds to a computation device that controls processing of the entire PLC 1. The functional units 150 provide various functions for realizing control of various machines or equipment by the PLC 1. The CPU unit 100 and the one or the plurality of functional units 150 are connected via a local bus 112 which is an example of a transmission path.

The CPU unit 100 can exchange data with any functional unit 150 via the local bus 112. Typically, the CPU unit 100 executes IO refresh with the one or the plurality of functional units 150 at every predetermined cycle. In the IO refresh, input data collected by each functional unit 150 is transmitted to the CPU unit 100, and a control instruction calculated by the CPU unit 100 is transmitted to any functional unit 150. In addition to such IO refresh, it is possible to transmit and receive data by message communication between the CPU unit 100 and any functional unit 150 or between any functional units 150. The message communication is not limited to a one-to-one mode and may be a one-to-many mode.

FIG. 1 shows a configuration in which a remote IO device is connected to the PLC 1 as an application configuration. That is, one or a plurality of communication coupler units 200 are connected to the CPU unit 100 via a field network 114 which is another example of the transmission path. One or a plurality of functional units 250 are connected to each communication coupler unit 200 via a local bus 212 which is an example of the transmission path.

Further, the functional units 150 and the functional units 250 have substantially the same configuration, and the reference numerals are different simply for convenience of description. However, some functions may be different between the functional units 150 connected to the CPU unit 100 and the functional units 250 connected to the communication coupler unit 200.

The CPU unit 100 may also perform IO refresh and message communication to the functional units 250 connected to the communication coupler unit 200. That is, the communication coupler unit 200 provides a function of mediating the data exchange between the CPU unit 100 and the functional units 250. More specifically, data transmitted from the CPU unit 100 via the field network 114 is transmitted onto the local bus 212 via the communication coupler unit 200 and delivered to the target functional units 250. Conversely, data transmitted from any functional unit 250 via the local bus 212 is transmitted onto the field network 114 via the communication coupler unit 200 and delivered to the CPU unit 100.

More specifically, the CPU unit 100 includes a processor 102, a main memory 104, a storage 106, a bus communication circuit 108, and a network interface 110.

The processor 102 executes a system program and a user program, whereby processing in the PLC 1 is realized. A central processing unit (CPU), a graphics processing unit (GPU) or the like, for example, can be used as the processor 102. The processor 102 may have a single-core and single-chip configuration or may have any of a multi-core single-chip, a single-core multi-chip, or a multi-core multi-chip configuration.

The main memory 104 is configured by a dynamic random access memory (DRAM), a static random access memory (SRAM), or the like, and provides a work area necessary for the execution of programs by the processor 102.

The storage 106 is configured by a semiconductor memory device, such as a flash memory, and stores a system program for realizing basic functions of the CPU unit 100, a user program arbitrarily created according to a control target, and the like.

The bus communication circuit 108 corresponds to a communication interface for exchanging data with the one or the plurality of functional units 150 via the transmission path and mediates data transmission between the CPU unit 100 and each functional unit 150 via the local bus 112 (the transmission path). At least a part of the bus communication circuit 108 may be implemented by a hard-wired circuit. The bus communication circuit 108 may function as a "master" that manages data transmission on the local bus 112. In this case, each of the functional units 150 connected to the local bus 112 may function as a "slave" that performs data transmission under the management of the bus communication circuit 108. Processing of data transmission and reception between the CPU unit 100 and each functional unit 150 with use of the bus communication circuit 108 will be described later.

The network interface 110 mediates data transmission via the field network 114 between the CPU unit 100 and any device including each communication coupler unit 200. The network interface 110 may function as a "master" that manages data transmission on the field network 114. In this case, the communication coupler unit 200 and other devices connected to the field network 114 may each function as a "slave" that performs data transmission under the management of the network interface 110. Further, a fixed cycle network according to a known protocol, such as EtherCAT (a registered trademark), EtherNet/IP (a registered trademark), DeviceNet (a registered trademark), CompoNet (a registered trademark) or the like, for example, may be adopted as the field network 114.

The functional units 150 provide any functions, such as collection of information necessary for the user program executed by the CPU unit 100, output of control instructions calculated by execution of the user program, and execution of special processing independent of the CPU unit 100. Typically, the functional units 150 may include an IO unit, a communication unit, a temperature adjustment unit, an identifier (ID) sensor unit, and the like.

For example, a digital input (DI) unit, a digital output (DO) unit, an analog input (AI) unit, an analog output (AO) unit, a pulse catch input unit, a composite unit obtained by mixing a plurality of types, and the like may be used as the IO unit.

The communication unit mediates the exchange of data with other PLCs, other remote IO devices, other functional units, and the like, and, for example, may include a communication device and the like according to a protocol such as EtherCAT (a registered trademark), EtherNet/IP (a registered trademark), DeviceNet (a registered trademark), CompoNet (a registered trademark) and the like.

The temperature adjustment unit is a control device including an analog input function that acquires a temperature measurement value and the like, an analog output function that outputs a control instruction and the like, and a proportional integral differential (PID) control function. The ID sensor unit is a device that reads data in a non-contact way from a radio frequency identifier (RFID) and the like.

More specifically, each of the functional units 150 includes a bus communication circuit 152, a communication controller 154, and a functional module 156.

The communication controller 154 processes data (typically communication frames) transmitted on the local bus 112. Specifically, the communication controller 154 transmits requested data via the local bus 112 according to the management by the bus communication circuit 108 which is the master and, upon receiving any data via the local bus 112, outputs it to the communication controller 154.

The communication controller 154 controls transmission and reception of data on the local bus 112 by executing a pre-stored program or logic. The communication controller 154 can be implemented with use of a processor configured to execute predetermined software or a processing circuit incorporating predetermined logic.

The functional module 156 performs various functions provided by each functional unit 150, such as collection of various information (input data) from the field and output of a control instruction to a control target (a machine or equipment) in the field.

In the functional units 150, basically, the functional module 156 handles execution of specific processing or provision of specific functions for each functional unit 150, and the bus communication circuit 152 and the communication controller 154 handle data transmission via the local bus 112.

The communication coupler unit 200 handles data transmission with the functional units 250 via the local bus 212 and also handles data transmission with the CPU unit 100 via the field network 114. More specifically, the communication coupler unit 200 includes a controller 201, a network interface 210, and a bus communication circuit 208.

The controller 201 mainly controls the network interface 210 and the bus communication circuit 208. As a typical example, the controller 201 includes a processor 202, a main memory 204, and a storage 206. The processor 202 develops in the main memory 204 a system program and the like stored in the storage 206 and executes the same to provide necessary processing and functions in the communication coupler unit 200. Further, at least a part of the controller 201 may be implemented by a hard-wired circuit.

The network interface 210 handles data transmission via the field network 114. The network interface 210 is identical in basic configuration with the network interface 110 of the CPU unit 100 except that the network interface 210 functions as a slave in the field network 114.

Like the bus communication circuit 108 of the CPU unit 100, the bus communication circuit 208 mediates data transmission between the communication coupler unit 200 and each functional unit 250 via the local bus 212.

The functional units 250 are substantially the same as the functional units 150 described above except that the functional units 250 are connected to the communication coupler unit 200. Each of the functional units 250 includes a bus communication circuit 252, a communication controller 254, and a functional module 256. The details of these functions have been described with respect to the functional units 150, and thus the detailed description will not be repeated here.

B. Data Transmission on the Local Bus

Next, data transmission between the CPU unit 100 and each functional unit 150 via the local bus 112 will be described. Further, the same applies to data transmission between the communication coupler unit 200 and each functional unit 250 via the local bus 212.

FIGS. 2(A) to 2(C) are schematic diagrams for illustrating data transmission on the local buses of the PLC 1 according to the embodiment. FIGS. 2(A) to 2(C) show an example in which arbitrary data is message-communicated in addition to the IO refresh repeatedly executed at every predetermined cycle.

Specifically, as shown in FIG. 2 (A), communication frames FL for performing the IO refresh at every predetermined system cycle Ts are sent out via the local bus 112 (the transmission path). Typically, the communication frames FL for performing the IO refresh are sent out from the CPU unit 100 and sequentially transmitted to the adjacent functional units 150. The input data collected by each functional unit 150 and the output data including the instruction for each functional unit 150 may be transmitted with use of different communication frames FL or may be transmitted in the same communication frame FL.

It is also possible to transmit data by arbitrary message communication during a period in which the communication frames FL for performing the IO refresh repeatedly transmitted at every predetermined cycle are not transmitted. Such message frames MSGFL may be transmitted from the CPU unit 100 to a specific functional unit 150, may be transmitted in the reverse direction, or may be transmitted between any functional units 150.

However, since the communication frame FL and the message frame MSGFL cannot be sent out simultaneously, even if a transmission request of the message frame MSGFL or the like is issued, if the IO refresh is in progress, generation and sending out of the designated message frame MSGFL will be delayed.

For example, as shown in FIG. 2 (B), it is assumed that a message transmission request is given during transmission of the communication frame FL for performing the IO refresh. In this case, the message frame MSGFL is generated and sent out after the transmission of the communication frame FL is completed. In the example shown in FIG. 2 (B), the message frame MSGFL is started to be sent out after a delay time D1 since the message transmission request is given.

Further, as shown in FIG. 2 (C), it is assumed that a message transmission request is given immediately before transmission of the communication frame FL for performing the IO refresh. In this case, since the transmission period of the communication frame FL is approaching, generation and sending out of the message frame MSGFL are prevented, and the message frame MSGFL is generated and sent out after the transmission of the subsequent communication frame FL is completed. In the example shown in FIG. 2 (C), the message frame MSGFL is started to be sent out after a delay time D2 since the message transmission request is given.

As described above, in the local bus where the communication frames FL for performing the IO refresh are cyclically transmitted, a certain extent of transmission delay occurs from when the message transmission request is given until when the communication frames FL are actually sent out.

Further, for convenience of description, FIGS. 2 (B) and 2 (C) do not consider things other than the IO refresh, but if a large number of message transmission requests have been issued earlier, transmission delay of the message frames occurs according to the number of the transmission requests made earlier and the like.

C. Example of Initialization Processing According to Related Art

Next, an example of initialization processing according to the related art with use of a communication frame message-communicated on a local bus will be described.

(c1: Initialization Processing)

Figure 3A:
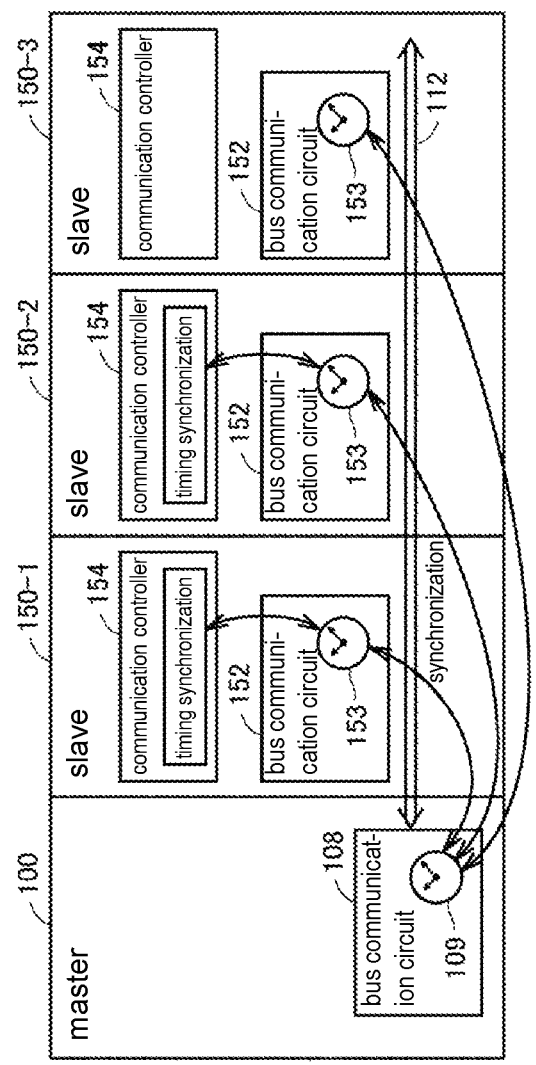
FIGS. 3(A) and 3(B) are schematic diagrams showing an example of initialization processing according to the related art in the PLC according to the embodiment.
Figure 3B:
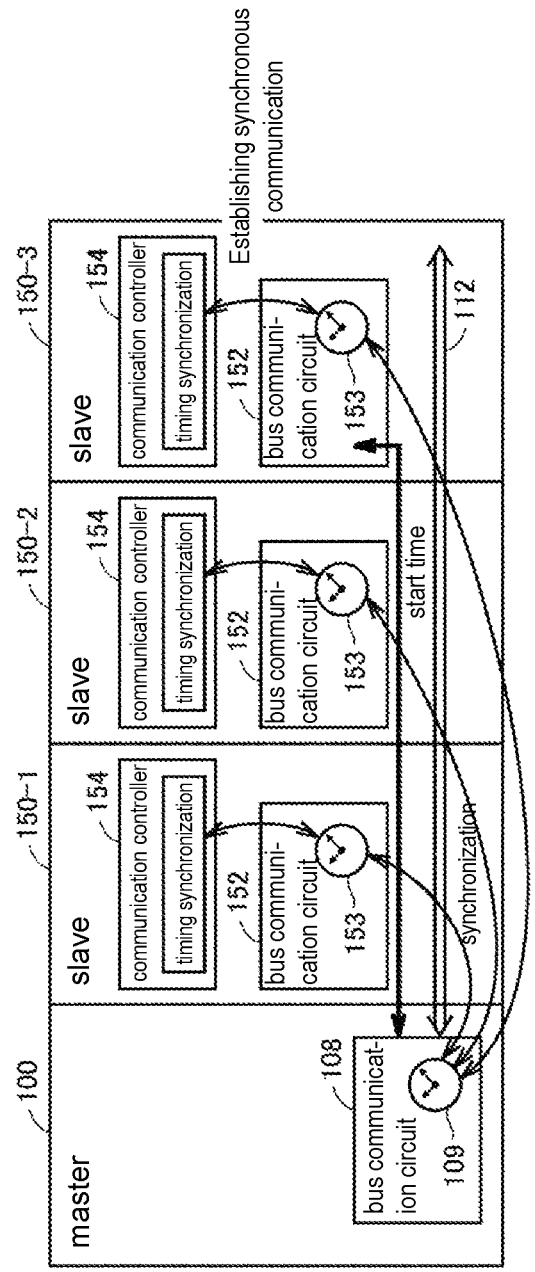

FIGS. 3(A) and 3(B) are schematic diagrams showing an example of initialization processing according to the related art in the PLC 1 according to the embodiment. The initialization processing shown in FIGS. 3(A) and 3(B) show an example of instructing a start time for synchronizing data transmission via the local bus 112 from the CPU unit 100 functioning as the master to the functional units 150 functioning as the slaves. The start time corresponds to an instruction for establishing synchronous communication and includes timing indicated by clocks synchronized with each other.

With reference to FIG. 3 (A), the CPU unit 100 functioning as the master and each of the functional units 150-1 to 150-3 respectively connected to the CPU unit 100 via the local bus 112 each have a clock synchronized with each other. More specifically, the bus communication circuit 108 of the CPU unit 100 has a master clock 109 as a reference for data transmission on the local bus 112, and the bus communication circuit 152 of each functional unit 150 has an ordinary clock 153 synchronized with the master clock 109.

The communication controller 154 of each functional unit 150 manages data transmission and reception with the timing indicated by the ordinary clock 153 of the bus communication circuit 152 as the reference. Such timing management of data transmission and reception with use of the clocks synchronized with each other can realize conflict-free data transmission on the local bus 112.

FIG. 3 (A) shows a state where synchronous communication is established with the CPU unit 100 only for the functional units 150-1 and 150-2. FIG. 3 (B) shows initialization processing for newly establishing synchronous communication also for the functional unit 150-3 in the state shown in FIG. 3 (A).

Specifically, in a state where the ordinary clock 153 of the functional unit 150-3 is synchronized with the master clock 109 of the CPU unit 100, timing (the start time) to start synchronous communication is notified from the CPU unit 100 to the functional unit 150-3 as the target. The functional unit 150-3 starts data transmission or reception when the ordinary clock 153 indicates the notified start time.

However, the start time notified from the CPU unit 100 must be a future time and is processed as invalid when a past time is designated. Such notification of the start time is transmitted by message communication according to any of the following procedures.

(c2: First Initialization Procedure)

A method of writing the start time in registers of the bus communication circuits 152 of the functional units 150 functioning as the slaves will be described as a first initialization procedure. The bus communication circuit 152 has a register (not shown) and issues an interrupt instruction to the communication controller 154 when a clock value of its own ordinary clock 153 reaches the start time written in this register to establish synchronization.

Figure 4:
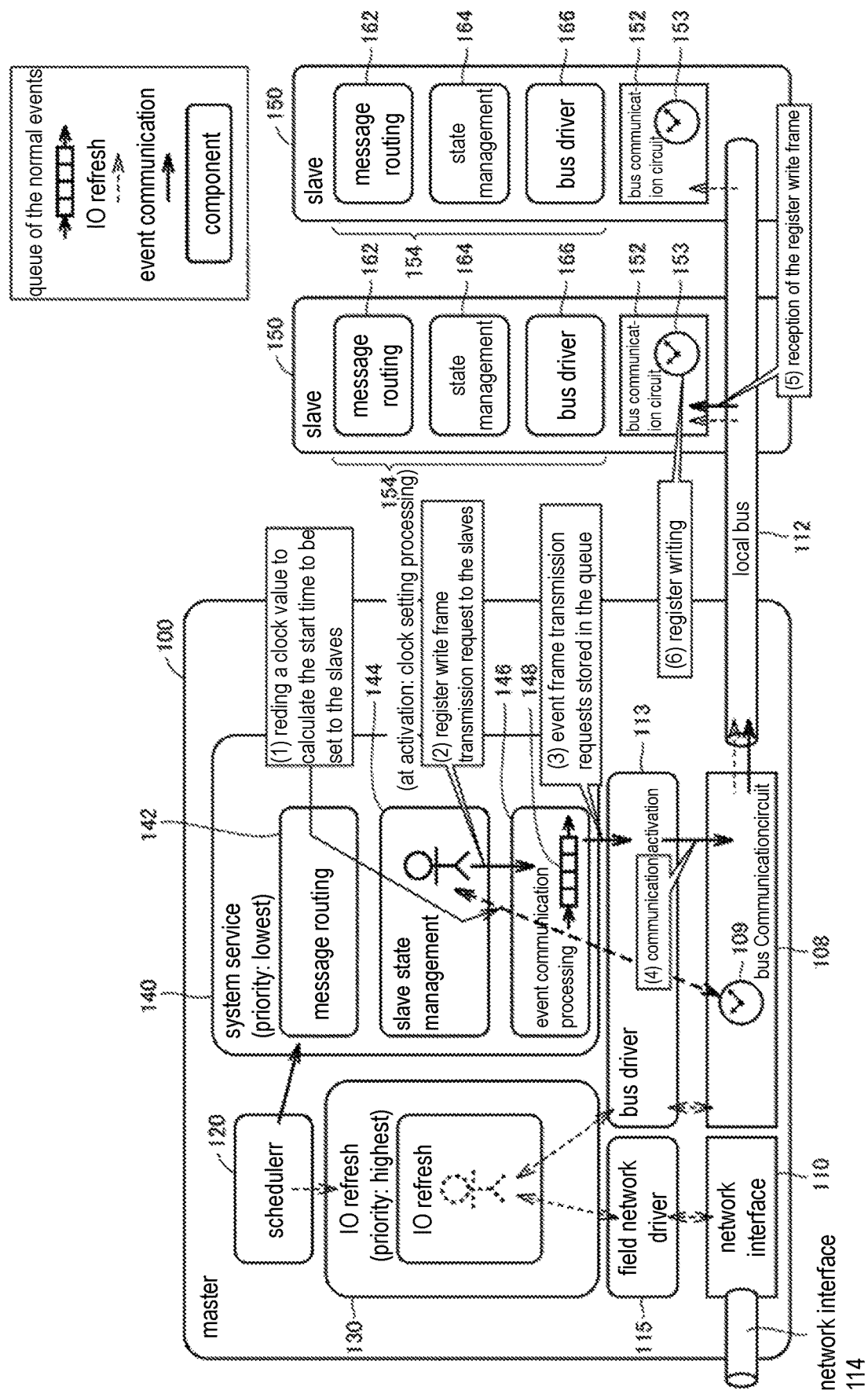
FIG. 4 is a schematic diagram showing the first initialization procedure between the CPU unit and the functional units.

FIG. 4 is a schematic diagram showing the first initialization procedure between the CPU unit 100 and the functional units 150. The basic software structure of the CPU unit 100 will be described first with reference to FIG. 4.

The CPU unit 100 includes a scheduler 120, a plurality of tasks (an IO refresh task 130 and system service tasks 140), a bus driver 113, and a field network driver 115. These components are realized by the processor 102 of the CPU unit 100 executing the system program and the user program.

The scheduler 120 controls execution cycles and execution timings of a plurality of tasks registered in advance based on priorities and the like set to the respective tasks. Among these tasks, the IO refresh task 130 is set with the highest priority and executes processing for sending out the communication frames (with reference to FIGS. 2(A) to 2(C) and the like) and the like for performing the IO refresh at every predetermined system cycle. On the other hand, the system service tasks 140 are set with the lowest priority and are appropriately executed during a period when other tasks, such as the IO refresh task 130, are not executed.

The IO refresh task 130 provides at least a part of the function of sending out the communication frame at every predetermined cycle (the system cycle Ts) via the local bus 112 (the transmission path) and gives a request to the bus driver 113 to transmit the communication frame for performing the IO refresh on the local bus 112. At the same time, the IO refresh task 130 transmits the communication frames or packets for performing the IO refresh onto the field network 114 by giving an instruction to the field network driver 115.

The system service tasks 140 include a message routing task 142, a slave state management task 144, and an event communication processing task 146. The message routing task 142 interprets a message frame on the local bus 112 or on the field network 114 and determines a path for transmitting the message frame. The slave state management task 144 manages the states of the slaves (the functional units 150) connected via the local bus 112.

The event communication processing task 146 provides at least a part of the function of sending out another communication frame in response to an arbitrary event request during a period in which the communication frame for performing the IO refresh is not transmitted. Specifically, the event communication processing task 146 executes processing of transmitting a message frame in response to any event request. The event communication processing task 146 manages a queue 148 that sequentially registers transmission requests.

In the following description, registration (input) of any data in a queue is also referred to as queuing, and deletion (output) of data from the queue is also referred to as dequeuing.

First, when the CPU unit 100 is activated or when a new functional unit 150 is added on the local bus 112, the slave state management task 144 executes clock setting processing. More specifically, the slave state management task 144 gives an instruction to each of the functional units 150 to synchronize the ordinary clocks 153 with the master clock 109.

In a state where the clocks are synchronized, as a first procedure, the slave state management task 144 reads a clock value from the master clock 109 of the bus communication circuit 108 and calculates the start time to be set to the slaves. Then, as a second procedure, the slave state management task 144 outputs, to the event communication processing task 146, a register write frame transmission request for writing the calculated start time to the registers for specific slaves (the functional units 150). This register write frame transmission request is registered in the queue 148. The event communication processing task 146 sequentially processes the transmission requests registered in the queue 148. When it becomes a state where the transmission requests registered in the queue 148 are sequentially processed and the register write frame transmission request registered earlier can be processed, as a third procedure, the event communication processing task 146 outputs an event frame transmission request to the bus driver 113. As a fourth procedure, the bus driver 113 activates the communication of the bus communication circuit 108 upon receiving the event frame transmission request. Then, the register write frame is sent out from the bus communication circuit 108 onto the local bus 112.

When the register write frame is received by the functional units 150 as a fifth procedure, as a sixth procedure, the bus communication circuits 152 of the functional units 150 write the start time included in the received register write frame into the internal registers. Then, the bus communication circuits 152 of the functional units 150 start synchronous processing when the ordinary clocks 153 reach the start time written in the registers.

The initialization processing for newly establishing synchronous communication between the CPU unit 100 and the functional units 150 is completed by the first to sixth procedures as described above.

(c3: Second Initialization Procedure)

Next, a second initialization procedure different from the above-described first initialization procedure will be described. A method in which the communication controllers 154 write the start time into the registers of the bus communication circuits 152 in response to the message frame message-communicated from the CPU unit 100 to the functional units 150 will be described as the second initialization procedure.

Figure 5:
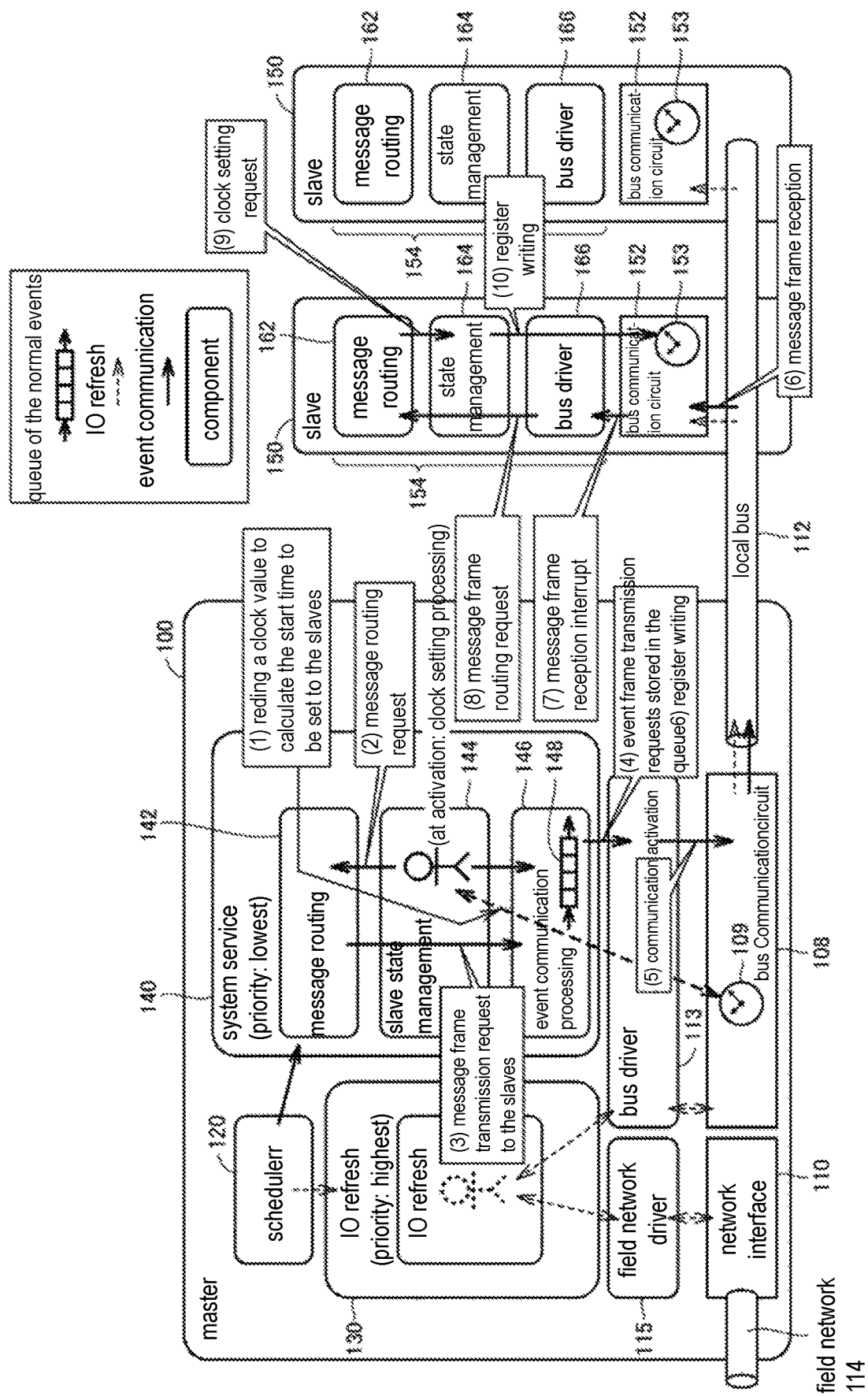
FIG. 5 is a schematic diagram showing the second initialization procedure between the CPU unit and the functional units.

FIG. 5 is a schematic diagram showing the second initialization procedure between the CPU unit 100 and the functional units 150. With reference to FIG. 5, the basic software structure of the functional units 150 will be described first with reference to FIG. 5.

In the functional units 150, a message routing task 162, a state management task 164, and a bus driver 166 are implemented. These components are provided by the communication controller 154.

The message routing task 162 interprets a message frame on the local bus 112 and determines a path for transmitting the message frame. The state management task 164 manages the state for connection to the CPU unit 100 via the local bus 112. The bus driver 113 manages transmission and reception of data exchanged on the local bus 112 via the bus communication circuit 152.

First, when the CPU unit 100 is activated or when a new functional unit 150 is added on the local bus 112, the slave state management task 144 executes clock setting processing. More specifically, the slave state management task 144 gives an instruction to each of the functional units 150 to synchronize the ordinary clocks 153 with the master clock 109.

In a state where the clocks are synchronized, as a first procedure, the slave state management task 144 reads a clock value from the master clock 109 of the bus communication circuit 108 and calculates the start time to be set to the slaves. Then, as a second procedure, the slave state management task 144 outputs, to the message routing task 142, a message routing request for a communication frame including the calculated start time to specific slaves (the functional units 150). As a third procedure, the message routing task 142 interprets the message routing request from the slave state management task 144 to specify a slave as the transmission destination and outputs, to the event communication processing task 146, a message frame transmission request for transmitting a message frame to the slave. This message frame transmission request is registered in the queue 148. The event communication processing task 146 sequentially processes the transmission requests registered in the queue 148. When it becomes a state where the transmission requests registered in the queue 148 are sequentially processed and the message frame transmission request registered earlier can be processed, as a fourth procedure, the event communication processing task 146 outputs an event frame transmission request to the bus driver 113. As a fifth procedure, the bus driver 113 activates the communication of the bus communication circuit 108 upon receiving the event frame transmission request. Then, the message frame is sent out from the bus communication circuit 108 onto the local bus 112.

When the functional unit 150 receives the message frame as a sixth procedure, as a seventh procedure, the bus communication circuit 152 of the functional unit 150 issues, to the bus driver 166, an interrupt accompanying the reception of the message frame. As an eighth procedure, the bus driver 166 outputs the received message frame to the message routing task 162 to request routing for the received message frame. As a ninth procedure, the message routing task 162 interprets that the content of the message frame from the bus driver 166 is a start time setting request to the bus communication circuit 152 and outputs a clock setting request to the state management task 164.

As a tenth procedure, the state management task 164 writes the designated start time to the register of the bus communication circuit 152 in response to the clock setting request. Then, the bus communication circuit 152 of the functional unit 150 starts synchronous processing when the ordinary clock 153 reaches the start time written in the register.

The initialization processing for newly establishing synchronous communication between the CPU unit 100 and the functional units 150 is completed by the first to tenth procedures as described above.

(c4: Issues)

Next, issues that may occur in the initialization procedures shown in FIGS. 4 and 5 will be described. As described with reference to FIGS. 4 and 5, the communication frames (the register write frame or the message frame) to be message-communicated from the CPU unit 100 are transmitted in response to the transmission requests generated in the system service tasks 140 set with the lowest priority.

Also, since transmission requests may be generated from other tasks, a message transmission request other than the register write frame transmission request or the message frame transmission request may already be registered in the queue 148 of the event communication processing task 146. Therefore, after the register write frame transmission request or the message frame transmission request is issued, when the frame transmission request will be processed depends on the state of the transmission requests registered in the queue 148 earlier.

Figure 6:
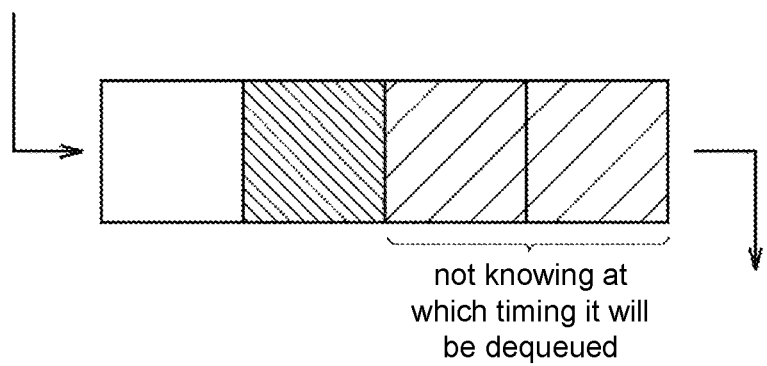
FIG. 6 is a schematic diagram for illustrating an issue in the initialization processing according to the related art.

FIG. 6 is a schematic diagram for illustrating an issue in the initialization processing according to the related art. With reference to FIG. 6, the frame transmission requests are registered and processed (queued and dequeued) in the queue 148 of the event communication processing task 146 by first-in first-out (FIFO). FIG. 6 shows a state where two transmission requests are already registered in the queue 148 when the register write frame transmission request (or the message frame transmission request) for executing the initialization processing as described above is registered in the queue 148. In such a state, it is not possible to accurately estimate when the two transmission requests registered earlier will be processed (dequeued).

As described above, the start time notified by the CPU unit 100 must be a future time. This requires the designated start time to be a future time when arriving at the functional units 150. On the other hand, as described above, there is an uncertain factor as to the timing when the communication frame including the start time will be transmitted.

Therefore, the following design is necessary: the worst time required for transmission of the communication frames in the queue 148 is estimated, and a sufficient margin is given to the designated start time according to the estimated time, so that the start time does not become a past time when arriving at the functional units 150.

Since many resources of the controller 201 can be used in the local bus 212 and the like of the communication coupler unit 200, it is relatively easy to estimate the margin to be set for the start time and to ensure the accuracy thereof. On the other hand, in the CPU unit 100, since a plurality of tasks are executed, the margin to be set to the start time varies greatly, and the estimation thereof is not easy. Furthermore, as shown in FIG. 6, there may be a case where it is necessary to wait till processing of the preceding transmission requests is completed.

For the reasons as described above, the initialization processing may be executed by excessively increasing the margin set for the indicated start time, or in the worst case, the initialization processing may fail and needs to be redone. In other words, in the initialization processing according to the related art as described above, it is not easy to complete the processing early and reliably.

Figure 7:
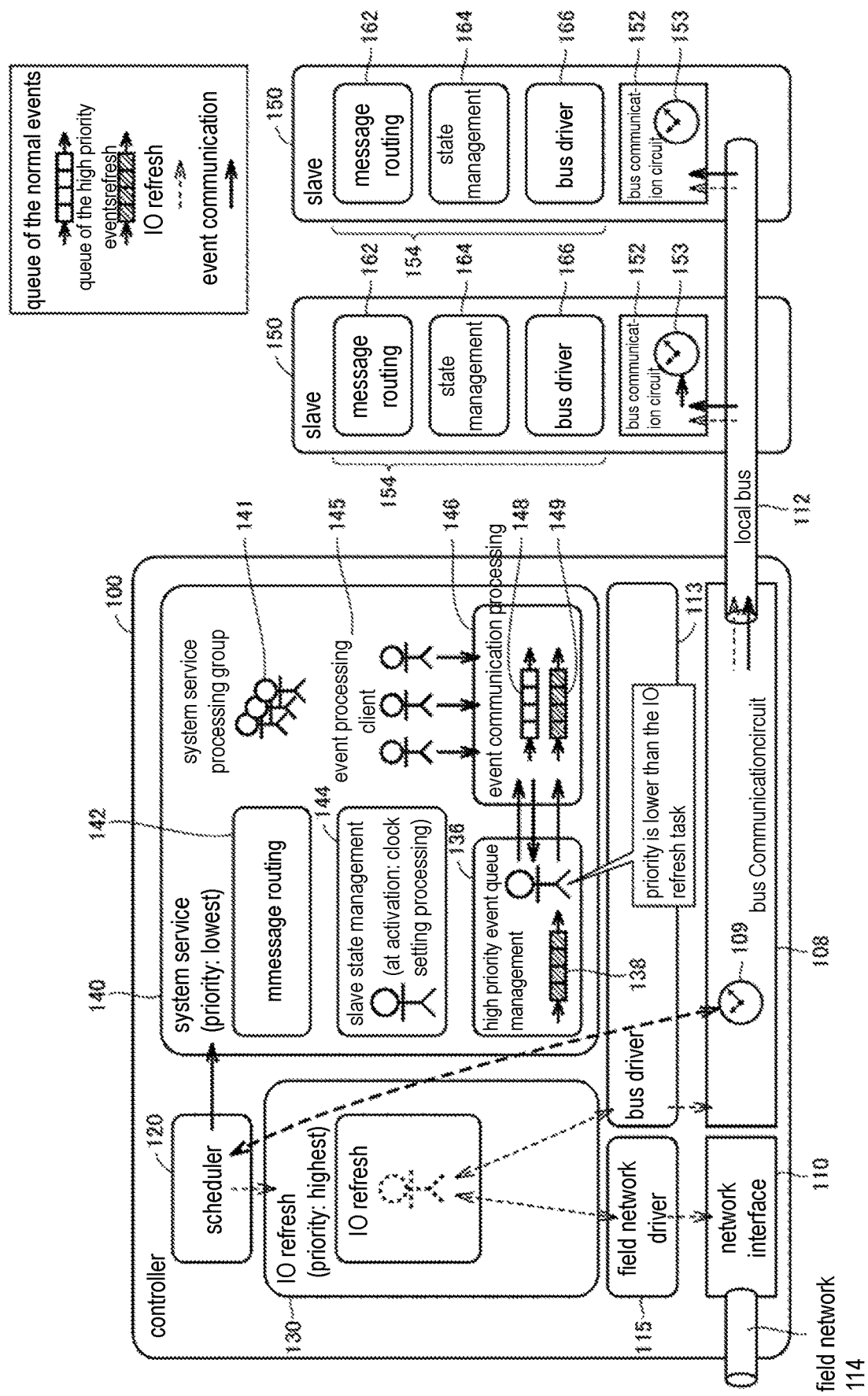
FIG. 7 is a schematic diagram showing a functional configuration in the PLC according to the embodiment.

D. Functional Configuration Relating to the Initialization Processing According to the Embodiment Next, a functional configuration relating to the initialization processing according to the embodiment will be described. FIG. 7 is a schematic diagram showing a functional configuration in the PLC 1 according to the embodiment. With reference to FIG. 7, compared with the configurations shown in FIG. 4 and FIG. 5, the CPU unit 100 of the PLC 1 according to the embodiment adds a high priority event queue management task 136, and in the event communication processing task 146, a queue 149 of high priority events is prepared in addition to the queue 148 of normal events. The event communication processing task 146 includes the queue 148, which sequentially stores normal event requests, and the queue 149, which sequentially stores high priority event requests.

In addition to the message routing task 142 and the slave state management task 144 shown in FIG. 7, there are other system service tasks (a system service processing group 141) as the system service tasks 140. A part or all of the system service processing group 141 generates an event processing client 145, and the event processing client 145 issues event requests according to processing. These event requests are registered in the event communication processing task 146 and the like.

The event processing client 145 issues a normal event request according to the processing, and the slave state management task 144 generates an event request relating to the start of initialization processing with the functional units 150, and this event request corresponds to a high priority event request having a higher priority than the normal event request. The high priority event request from the event processing client 145 includes an instruction for the specific functional unit 150 to establish synchronous communication with the CPU unit 100 via the local bus 112 (the transmission path).

In this specification, an "event request" refers to a request relating to various processing (including data transmission by message communication) generated by an internal event which is issued by arrival of any condition or cycle. The terms of "normal" and "high priority" are terms that indicate relative superiority or inferiority of the priorities, and a "high priority" event request means that it is processed with priority over a "normal" event request. The terms of "normal" and "high priority" are for convenience of reference and should not be construed as limiting.

The high priority event queue management task 136 provides at least a part of a priority management function for processing the high priority event request issued by the slave state management task 144 with priority. Specifically, the high priority event queue management task 136 manages a high priority event queue 138 for controlling the output timing and the like of the transmission requests to the queue 149 of the high priority events. As described later, the high priority event request is registered in the high priority event queue 138 from the slave state management task 144 according to the needs. The processing procedure between the high priority event queue management task 136 and the event communication processing task 146 will be described later.

E. Processing Procedure in the Initialization Processing According to the Embodiment Next, a processing procedure in the initialization processing according to the embodiment will be described.

Figure 8:
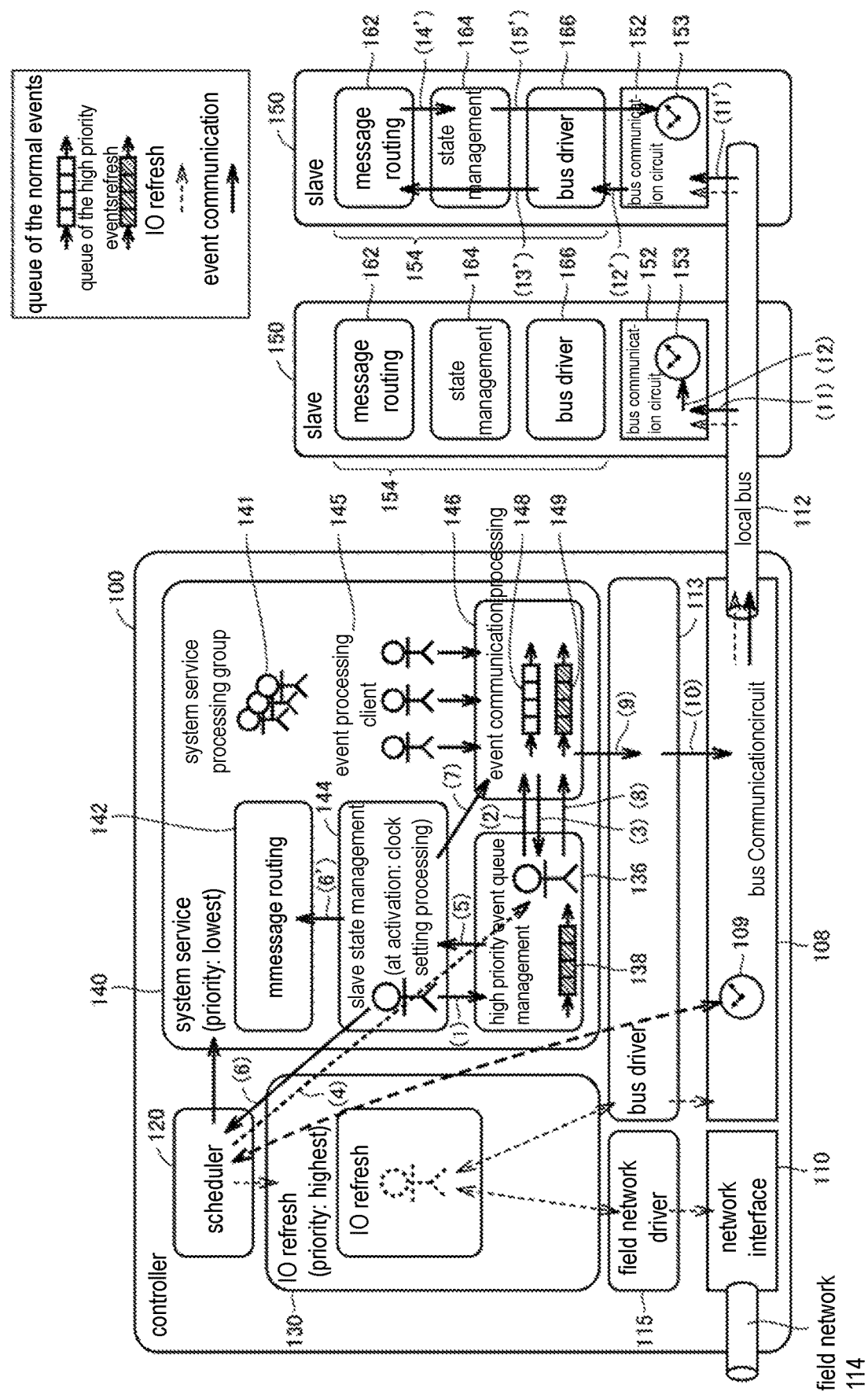
FIG. 8 is a schematic diagram for illustrating exchange between modules in the initialization processing according to the embodiment.
Figure 9:
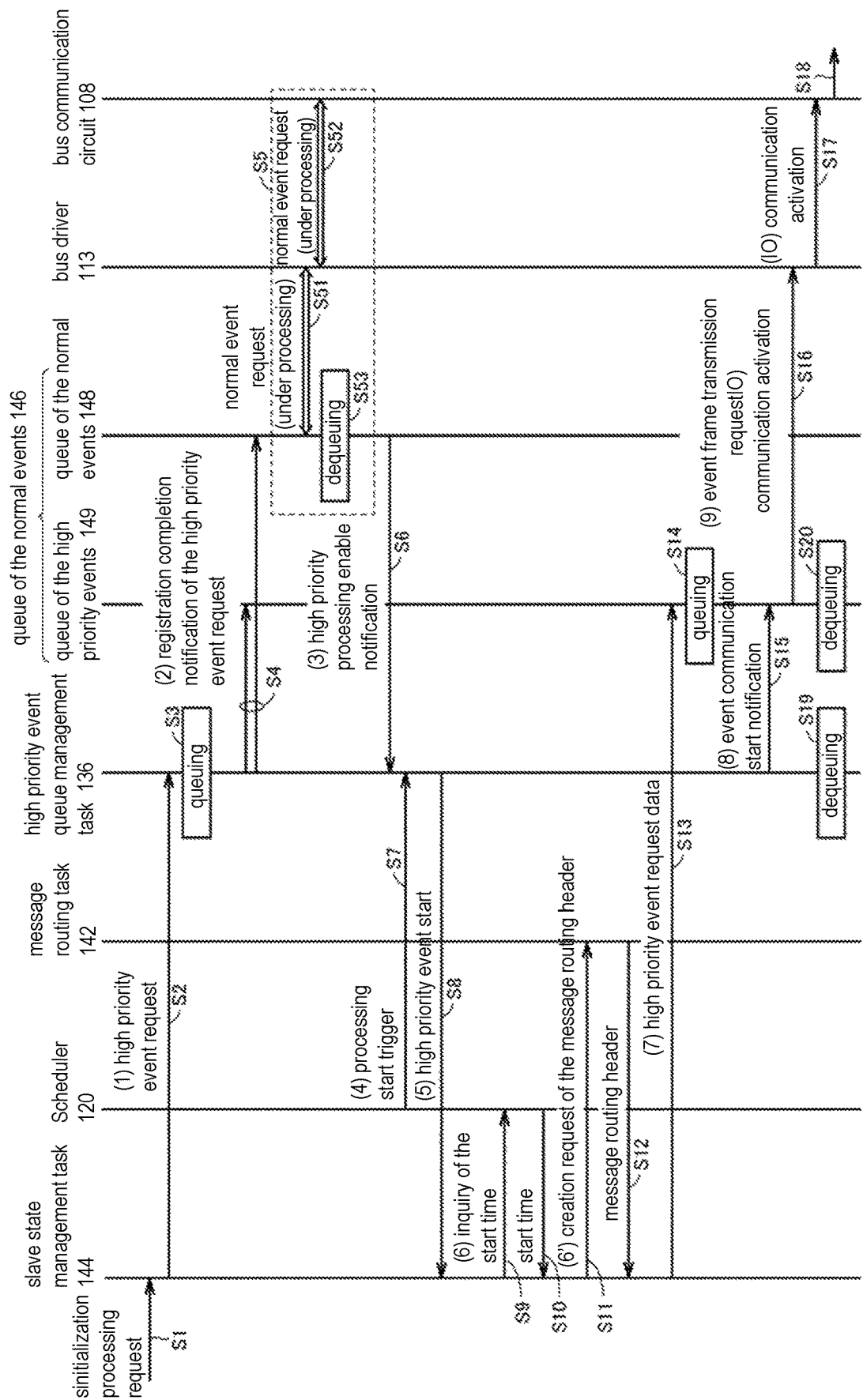
FIG. 9 is a sequence diagram showing a processing procedure in the initialization processing according to the embodiment.

FIG. 8 is a schematic diagram for illustrating exchange between modules in the initialization processing according to the embodiment. FIG. 9 is a sequence diagram showing a processing procedure in the initialization processing according to the embodiment. Further, the numbers in parentheses shown in FIG. 8 correspond to the numbers in parentheses shown in FIG. 9.

First, when the CPU unit 100 is activated or when a new functional unit 150 is added on the local bus 112, the slave state management task 144 executes clock setting processing. More specifically, the slave state management task 144 gives an instruction to each of the functional units 150 to synchronize the ordinary clocks 153 with the master clock 109. Each step shown in FIG. 9 is executed in a state where the clocks are synchronized.

With reference to FIGS. 8 and 9, first, the slave state management task 144, upon receiving an initialization processing request (Step S1), issues a high priority event request to the high priority event queue management task 136 (Step S2). Then, the high priority event queue management task 136 queues the issued high priority event request in the high priority event queue 138 (Step S3). That is, the high priority event request is registered in the high priority event queue 138. Then, the high priority event queue management task 136 notifies the event communication processing task 146 (the queue 148 of the normal events and the queue 149 of the high priority events) that the high priority event request is registered (Step S4).

In the event communication processing task 146, if there is any of the normal event requests, among those registered in the queue 148 of the normal events, under transmission processing, the processing of the normal event request under transmission processing is continued (Step S5). More specifically, the event communication processing task 146 outputs to the bus driver 113 the normal event request under transmission processing among the normal event requests registered in the queue 148 (Step S51). The bus driver 113 activates the communication of the bus communication circuit 108 in accordance with the normal event request (Step S52). Then, a communication frame or the like corresponding to the normal event request is sent out from the bus communication circuit 108 onto the local bus 112. When the processing for the registered normal event request is completed, the event communication processing task 146 deletes (dequeues) the normal event request registered in the queue 148 (Step S53).

If there is a normal event request under transmission processing when the event communication processing task 146 receives the notification that the high priority event request is registered, the event communication processing task 146 notifies the high priority event queue management task 136 of a high priority processing enable notification when the processing of the normal event request under transmission processing is completed (Step S6). At this time, though some event requests are registered in the queue 148 of the event communication processing task 146, for those that have not become processing targets yet, the processing thereof is temporarily suspended.

Further, if any high priority event request is registered earlier in the queue 149 of the high priority events, the high priority processing enable notification is notified to the priority event queue management task 136 after the processing of the high priority event request registered earlier is completed. That is, the high priority processing enable notification is a notification indicating that it is a state where the high priority event request can be processed with priority, as described later.

Thereafter, the scheduler 120 cyclically issues a trigger instructing the start of the processing to the high priority event queue management task 136 (Step S7). The scheduler 120 issues the trigger of Step S7 at a timing that does not prevent the execution of the IO refresh by the IO refresh task 130.

The high priority event queue management task 136, when receiving the trigger from the scheduler 120, notifies the slave state management task 144 of a high priority event start if a thread (set with a priority higher than normal) relating to the high priority event has been activated and if the high priority event queue management task 136 receives the high priority processing enable notification from the event communication process task 146 (Step S8). The thread relating to the high priority event is set to have a priority high enough to guarantee realistic real time but lower than the priority of the IO refresh.

As shown in the above-described Steps S4 to S8, when an issuance request of the high priority event request (the high priority event request shown in Step S2) is received, the completion of the transmission processing of the communication frame corresponding to the normal event request currently under processing is waited for, and then issuance of the high priority event request is permitted (the high priority processing enable notification is issued). At this time, the processing for subsequent normal event requests following the normal event request currently under processing are suspended until the processing for the high priority event request is completed.

The high priority event start notified to the slave state management task 144 corresponds to an acknowledgment (callback) to the high priority event request (Step S2) from the slave state management task 144, and processing of determining the timing (the start time) and the like necessary for the initialization processing is started by the high priority event start. More specifically, the slave state management task 144 inquires the scheduler 120 about the start time to be set for the functional units 150 that are the targets of the initialization processing (Step S9). In response to this inquiry, the scheduler 120 calculates the start time and responds to the slave state management task 144 (Step S10). A value managed by the ordinary clock 153 of each functional unit 150 synchronized with the master clock 109 of the bus communication circuit 108 is used as the start time.

Figure 10:
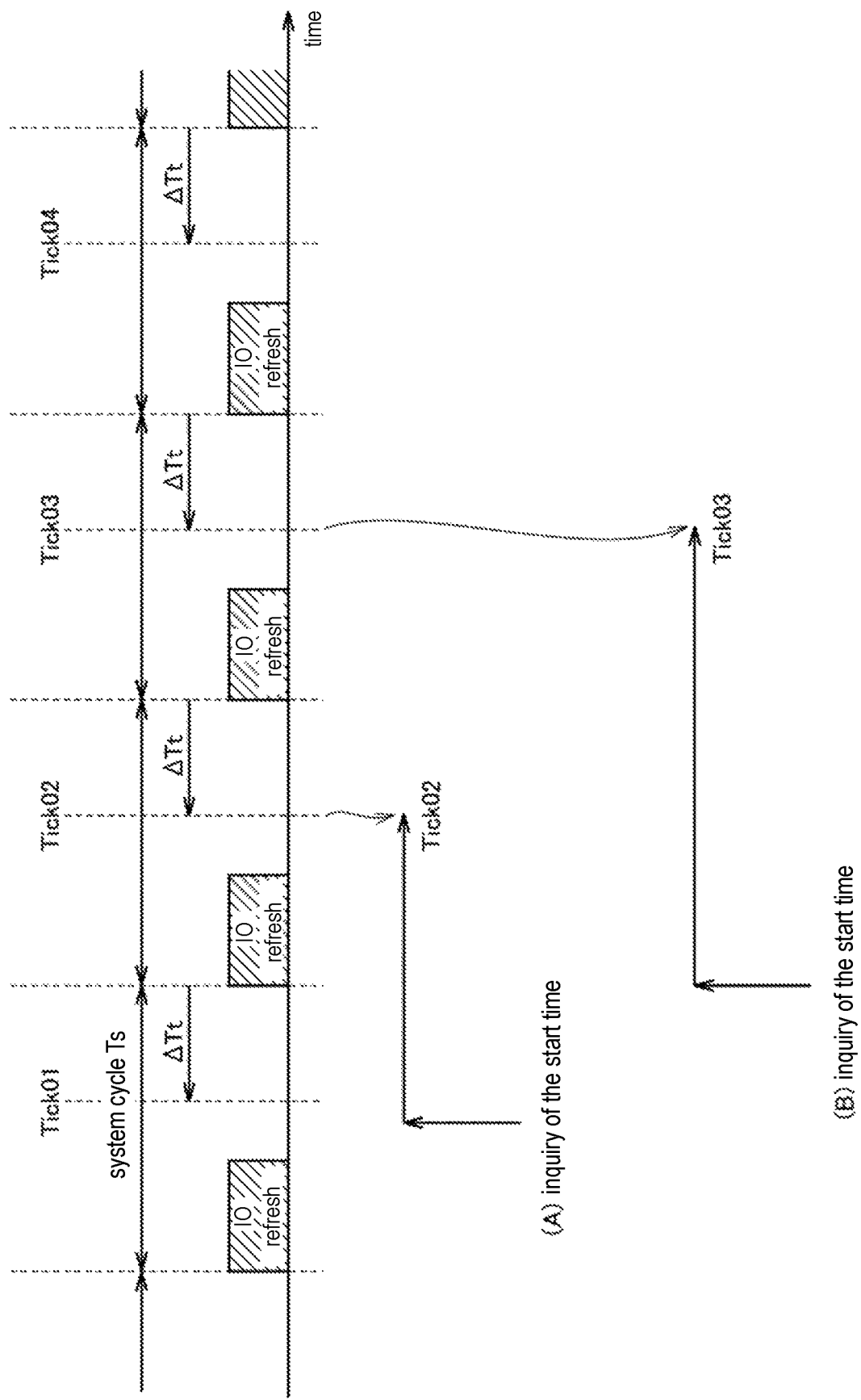
FIG. 10 is a schematic diagram for illustrating the start time responded by the scheduler of the PLC according to the embodiment.

For example, a value associated with the transmission cycle (the system cycle) of the IO refresh may be used as the start time responded by the scheduler 120. Specifically, a Tick time set before transmission of the communication frames of the IO refresh may be used. FIG. 10 is a schematic diagram for illustrating the start time responded by the scheduler 120 of the PLC 1 according to the embodiment. With reference to FIG. 10, the communication frames for performing the IO refresh at every predetermined system cycle Ts are transmitted. Each functional unit 150 transmits input data collected in advance to the CPU unit 100 functioning as the master and acquires output data transmitted from the CPU unit 100 with use of one or a plurality of communication frames according to a predetermined communication procedure.

The Tick time is set to be ΔTt earlier than a predetermined time when the communication frame for performing the IO refresh arrives at each functional unit 150, and each functional unit 150 starts collecting input data at the Tick time. Therefore, if any Tick time is designated as the start time, it is possible to write input data to a communication frame that arrives immediately after the designated Tick time. That is, synchronous communication with the CPU unit 100 can be established.

In the PLC 1 according to the embodiment, the second future Tick time (or even later) from the current time may be set as the start time. As described above, at the timing when the slave state management task 144 makes an inquiry about the start time to the scheduler 120 (Step S9), it becomes a state where the start time with the highest priority other than the IO refresh can be notified. Therefore, it can be guaranteed that the start time is notified in a period until at least two Tick times later.

For example, in the situation (A), when the start time inquiry is received immediately after the preceding IO refresh and before the Tick time of the subsequent IO refresh arrives, Tick02 which is the Tick time in the second future IO refresh is set as the start time.

Alternatively, in the situation (B), when the start time inquiry is received immediately before a certain IO refresh, Tick03 which is the Tick time in the second future IO refresh is set as the start time.

With reference again to FIGS. 8 and 9, the slave state management task 144 requests the message routing task 142 to create a message routing header according to the needs (Step S11). Specifically, as in the second initialization procedure shown in FIG. 5 described above, the slave state management task 144 requests creation of a message routing header for transmitting a message frame to the functional unit 150 as the initialization target when the initialization procedure is realized by a method of transmitting a message frame from the CPU unit 100 to the functional unit 150. The message routing task 142 responds to the slave state management task 144 by creating a necessary header according to the position of the functional unit 150 as the initialization target on the local buses 112 and 212 and/or the field network 114 (Step S12). As described above, the processing of these Steps S11 and S12 is optional processing.

Then, the slave state management task 144 outputs data to be transmitted as a high priority event request to the event communication processing task 146 (Step S13). The event communication processing task 146 queues the data from the slave state management task 144 in the queue 149 of the high priority events (Step S14). That is, the data to be transmitted as a high priority event request is registered in the queue 149 of the event communication processing task 146. The data to be transmitted as a high priority event request includes the start time acquired in Step S10. When the same initialization procedure as the above-described first initialization procedure is adopted, information necessary for generation of a register write frame is included in addition to the start time. On the other hand, when the same initialization procedure as the above-described second initialization procedure is adopted, information necessary for generation of a message frame is included in addition to the start time.

After the necessary data is registered in the queue 149, the high priority event queue management task 136 notifies the event communication processing task 146 of the start of the event communication (Step S15). With the start of the event communication, in the event communication processing task 146, generation of a necessary message (a communication frame or a message) and activation of the communication for the bus communication circuit 108 are started. That is, the event communication processing task 146 receives the event communication start notification from the high priority event queue management task 136 and outputs the event frame transmission request to the bus driver 113 (Step S16). The bus driver 113 activates the communication of the bus communication circuit 108 upon receiving the event frame transmission request (Step S17). Then, the designated communication frame (the register write frame or the message frame) is sent out from the bus communication circuit 108 onto the local bus 112 (Step S18).

Further, the communication frames corresponding to the high priority event request and the normal event request are sent out in a period in which the communication frames of the IO refresh are not transmitted.

After output of the event frame transmission request from the event communication processing task 146 to the bus driver 113, the high priority event queue management task 136 dequeues the high priority event request from the high priority event queue 138 (Step S19). That is, the high priority event request is deleted from the high priority event queue 138. At the same time, the event communication processing task 146 dequeues data as the processing target from the queue 149 of the high priority events (Step S20). That is, the data necessary for the initialization processing is deleted from the queue 149 of the high priority events.

Thereafter, when the same initialization procedure as the first initialization procedure is adopted, the same processing as described with reference to FIG. 4 is executed in the functional units 150 (with reference to (11) and (12) of FIG. 8). Alternatively, when the same initialization procedure as the second initialization procedure is adopted, the same processing as described with reference to FIG. 5 is executed in the functional units 150 (with reference to (11') to (15') of FIG. 8).

The initialization processing for newly establishing synchronous communication between the CPU unit 100 and the functional units 150 is completed by the processing procedure as described above.

Figure 11A:
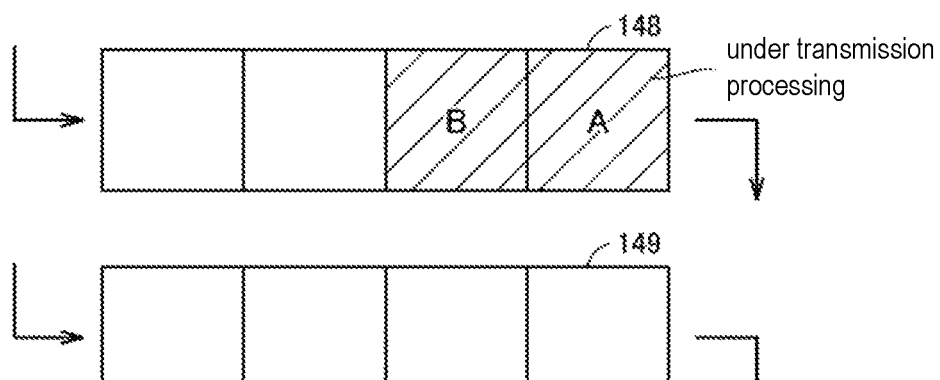
FIGS. 11(A) to 11(C) are schematic diagrams for illustrating processing in the queue of the normal events and the queue of the high priority events of the event communication processing task of the PLC according to the embodiment.
Figure 11B:
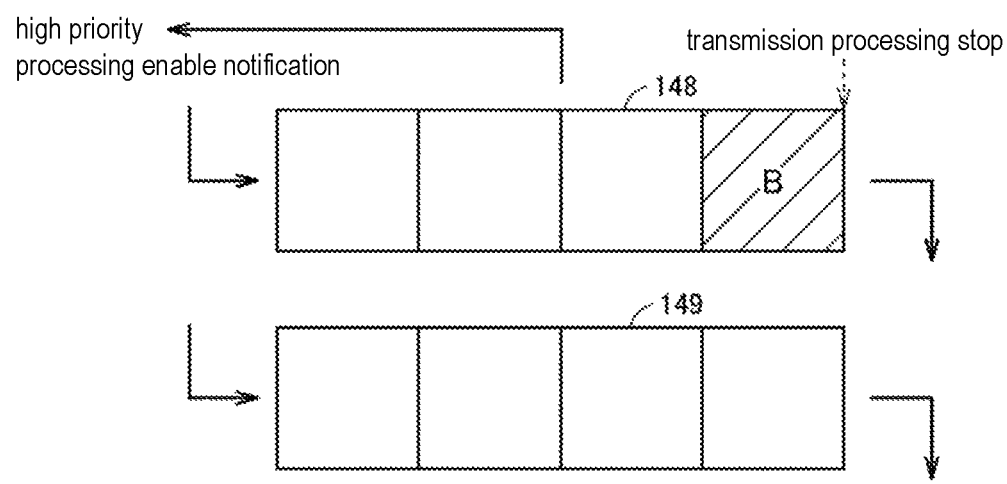
Figure 11C:
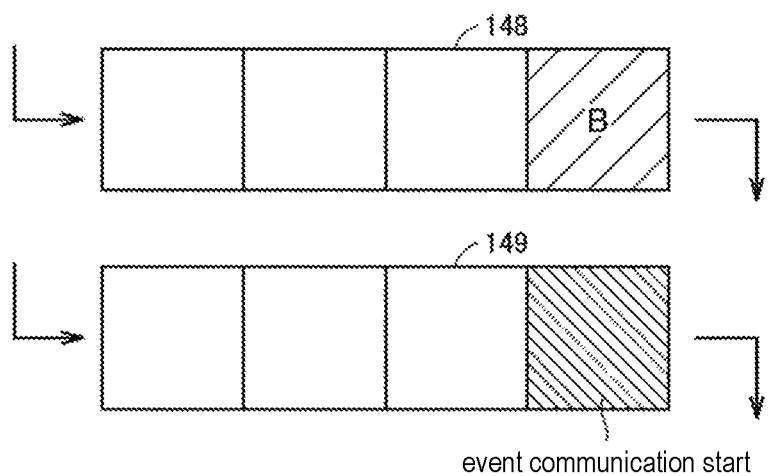

Here, the processing in the high priority event queue management task 136 and the event communication processing task 146 (with reference to Steps S4, S5, S14, S16, etc. shown in FIG. 9) will be described in more detail. FIGS. 11(A) to 11(C) are schematic diagrams for illustrating processing in the queue 148 of the normal events and the queue 149 of the high priority events of the event communication processing task 146 of the PLC 1 according to the embodiment.

With reference to FIG. 11 (A), for example, a case is assumed in which the high priority event queue management task 136 has performed a registration notification of a high priority event request when normal event requests A and B are registered in the queue 148 and the normal event request A is under transmission processing. At this time, the high priority event queue management task 136, when receiving an issuance request of the high priority event request (the high priority event request shown in Step S2 of FIG. 8) from the slave state management task 144, waits for the completion of the transmission processing of the communication frame corresponding to the normal event request currently under processing in the event communication processing task 146 and permits the slave state management task 144 to issue the high priority event request (the high priority processing enable notification shown in Step S6 of FIG. 8).

Specifically, the high priority event queue management task 136, when receiving the issuance request of the high priority event request (the high priority event request shown in Step S2 of FIG. 8) from the slave state management task 144, notifies the event communication processing task 146 of the issuance request of the high priority event request. Then, the event communication processing task 146 continues the transmission processing executed for the normal event request A. Then, as shown in FIG. 11 (B), when the transmission processing for the normal event request A, which has been executed earlier, is completed, the normal event request A is deleted from the queue 148 while execution of the transmission processing for the normal event request B registered next in the queue 148 is temporarily stopped. Then, the event communication processing task 146, after notified of the issuance request of the high priority event request, notifies the high priority event queue management task 136 of the high priority processing enable notification, which is an indication that the high priority event request can be processed, when processing for the normal event request currently under processing is completed.

Then, as shown in FIG. 11 (C), the data corresponding to the high priority event request is registered in the queue 149. Then, when the event communication start notification is received, the data registered in the queue 149 is output to the bus driver 113.

Further, as shown in FIG. 11 (B), a new normal event request can be received even in a state where the execution of processing for the normal event request registered in the queue 148 is temporarily stopped. That is, when a new normal event request is issued, this normal event request is additionally registered in the queue 148. These normal event requests are sequentially executed after the processing for the high priority event request is completed.

In this way, the event communication processing task 146 suspends the processing for the subsequent normal event requests following the normal event request currently under processing until the processing for the high priority event request is completed. That is, after processing of only the normal event request under processing, among the normal event requests earlier registered in the queue 148, is performed, it is notified that the high priority processing can be performed in a state where the processing of the subsequent normal event requests is suspended. By adopting such processing, when it has become a state where the communication frame corresponding to the requested high priority event request can be transmitted with the highest priority, the corresponding necessary data is registered in the queue 149.

As shown in FIGS. 11(A) to 11(C), arbitration processing of the normal event request and the high priority event request is adopted, whereby, for example, the arrival time of the communication frames used for the initialization processing and the like can be guaranteed.

FIGS. 7 and 11(A) to 11(C) show an example in which the queue 148 of the normal events and the queue 149 of the high priority events are disposed independently, but it is not necessary to dispose the two independently. According to the processing method as shown in FIG. 11(A) to 11(C), any implementation form may be used as long as the high priority event request is processed with priority as compared with the normal event request.

F. Modified Example

Although the above embodiment has illustrated a case applied to the initialization processing between the CPU unit 100 and the functional units 150 connected via the local bus 112 as a typical example, the invention is not limited thereto. The communication procedure according to the embodiment is applicable to any processing. The same initialization processing may be applied to, for example, the initialization processing between the communication coupler unit 200 and the functional units 250 connected via the local bus 212 or may be applied to the initialization processing between the CPU unit 100 and any devices (which may include the communication coupler unit 200) connected via the field network 114.

Furthermore, it is applicable to any processing procedure realized by data exchange by message communication between the CPU unit 100 and the specific one or the plurality of functional units 150, between the communication coupler unit 200 and the specific one or the plurality of functional units 250, between the plurality of functional units 150, or between the plurality of functional units 250.

G. Advantages

In the initialization processing according to the related art as described above, since the timing of message communication is determined according to low priority scheduling, when another event requesting message communication occurs, it is difficult to predict at which timing the requested communication frame can be sent out.

On the other hand, in the initialization processing of the PLC 1 according to the embodiment, the transmission of the communication frame relating to the initialization processing can be a high priority event request and can be processed with priority over the normal event requests generated by other event processing clients.

Moreover, when the high priority event request is issued in a case where the normal event request issued earlier is under processing, it is necessary to wait for the completion of the processing of the normal event request under processing earlier, but in the embodiment, it is controlled so that the high priority event request issues itself after the processing of the normal event request under processing earlier is completed. By adopting such a control method, the conflict between the normal event request and the high priority event request (that is, the situation where the high priority event request cannot be processed if the normal event request is not completed) is avoided, and the processing of the event requests according to the priority can be performed reliably.

If the control method according to the related art as described above is adopted, since the processing time for each event request cannot be guaranteed, in order to keep the time constraint, it is necessary to assume the worst arrival time with a margin to execute communication processing. However, according to the embodiment, since it is possible to guarantee the arrival time, it is not necessary to assume the worst arrival time or the like for the communication processing relating to the high priority event.

In addition, when the control method according to the related art as described above is adopted, it is difficult to estimate the worst arrival time after the event request is issued until the communication frame actually reaches the transmission destination, and if the worst arrival time is assumed on the safe side, it may lead to processing delays in the entire system. On the other hand, according to the embodiment, since the arrival time can be guaranteed, the necessary processing time and the like can be easily estimated, and the processing time itself can be shortened. Therefore, the activation time and the like of the processing can be shortened, and usability can be improved.

The embodiments disclosed herein are exemplary and should not be construed restrictive in all aspects. The scope of the invention is defined by the claims instead of the above descriptions, and it is intended to include the equivalent of the scope of the claims and all modifications within the scope.

What is claimed is:

1. A computation device, configuring a control device, comprising:

a communication interface that exchanges data with one or a plurality of functional units via a transmission path;

a first transmission control part that sends out a first communication frame at every predetermined cycle via the transmission path;

a second transmission control part that sends out a second communication frame in response to an arbitrary event request during a period in which the first communication frame is not transmitted;

a first event issuance part that issues a first event request according to processing;

a second event issuance part that issues a second event request having a higher priority than the first event request; and a priority management part that processes the second event request issued by the second event issuance part with priority, wherein the priority management part, upon receiving an issuance request of the second event request from the second event issuance part, waits for completion of sending processing for the second communication frame corresponding to the first event request currently under processing by the second transmission control part, and then permits issuance of the second event request to the second event issuance part, and the second transmission control part suspends processing for a subsequent first event request following the first event request currently under processing until completion of processing for the second event request.

2. The computation device according to claim 1, wherein the second transmission control part comprises:

a first queue that sequentially stores the first event request; and a second queue that sequentially stores the second event request.

3. The computation device according to claim 2, wherein the priority management part, upon receiving the issuance request of the second event request, notifies the second transmission control part of the issuance request, and the second transmission control part, after notified of the issuance request of the second event request, notifies the priority management part of an indication that the second event request can be processed when the processing for the first event request currently under processing is completed.

4. The computation device according to claim 3, wherein the second event request comprises an instruction for a specific functional unit to establish synchronous communication with the computation device via the transmission path.

5. The computation device according to claim 4, wherein the computation device and the one or the plurality of functional units connected via the transmission path each have a clock synchronized with each other, and the instruction to establish the synchronous communication comprises timing indicated by the clocks synchronized with each other.

6. The computation device according to claim 5, wherein the timing is set to a value associated with a transmission cycle of the first communication frame.

7. The computation device according to claim 2, wherein the second event request comprises an instruction for a specific functional unit to establish synchronous communication with the computation device via the transmission path.

8. The computation device according to claim 7, wherein the computation device and the one or the plurality of functional units connected via the transmission path each have a clock synchronized with each other, and
the instruction to establish the synchronous communication comprises timing indicated by the clocks synchronized with each other.

9. The computation device according to claim 8, wherein the timing is set to a value associated with a transmission cycle of the first communication frame.

10. The computation device according to claim 1, wherein the second event request comprises an instruction for a specific functional unit to establish synchronous communication with the computation device via the transmission path.

11. The computation device according to claim 10, wherein the computation device and the one or the plurality of functional units connected via the transmission path each have a clock synchronized with each other, and
the instruction to establish the synchronous communication comprises timing indicated by the clocks synchronized with each other.

12. The computation device according to claim 11, wherein the timing is set to a value associated with a transmission cycle of the first communication frame.

13. A control device, comprising:
a computation device; and
one or a plurality of functional units connected to the computation device via a transmission path so as to be able to exchange data,
wherein the computation device comprises:
a first transmission control part that sends out a first communication frame at every predetermined cycle via the transmission path;
a second transmission control part that sends out a second communication frame in response to an arbitrary event request during a period in which the first communication frame is not transmitted;
a first event issuance part that issues a first event request according to processing;
a second event issuance part that issues a second event request having a higher priority than the first event request; and
a priority management part for processing the second event request issued by the second event issuance part with priority,
wherein the priority management part, upon receiving an issuance request of the second event request from the second event issuance part, waits for completion of sending processing for the second communication frame corresponding to the first event request currently under processing by the second transmission control part, and then permits issuance of the second event request to the second event issuance part, and
the second transmission control part suspends processing for a subsequent first event request following the first event request currently under processing until completion of processing for the second event request.

14. A control method in a control device comprising a computation device and one or a plurality of functional units connected to the computation device via a transmission path so as to be able to exchange data, the control method comprising:
sending out a first communication frame at every predetermined cycle via the transmission path;
issuing a first event request according to processing;
issuing a second event request having a higher priority than the first event request;
sending out a second communication frame in response to the first event request or the second event request during a period in which the first communication frame is not transmitted;
upon receiving an issuance request of the second event request, waiting for completion of sending processing for the second communication frame corresponding to the first event request currently under processing, and then permitting issuance of the second event request; and
suspending processing for a subsequent first event request following the first event request currently under processing until completion of processing for the second event request.

* * * * *